(12) United States Patent
Im (10) Patent No.: US 8,459,596 B2
(45) Date of Patent: Jun. 11, 2013

(54) SKY/SPACE ELEVATORS

(76) Inventor: Sunstar Im, Lancaster, CA (US)

( * ) Notice: Subject to any disclaimer, the term of this patent is extended or adjusted under 35 U.S.C. 154(b) by 24 days.

(21) Appl. No.: 12/592,655

(22) Filed: Dec. 1, 2009

(65) Prior Publication Data

US 2011/0127382 A1   Jun. 2, 2011

(51) Int. Cl.
  *B64G 1/00* (2006.01)
  *B64G 1/24* (2006.01)
  *B64G 1/26* (2006.01)
  *B64G 1/62* (2006.01)

(52) U.S. Cl.
  USPC .................. 244/158.1; 244/158.4; 244/158.9; 244/172.4

(58) Field of Classification Search
  USPC ...................... 244/158.1, 158.2, 158.4, 171.6, 172.4–172.6, 173.1, 173.3, 24, 158.9
  See application file for complete search history.

(56) References Cited

U.S. PATENT DOCUMENTS

| | | | | |
|---|---|---|---|---|
| 3,144,219 A * | 8/1964 | Schnitzer | .................. | 244/158.3 |
| 3,169,725 A * | 2/1965 | Berglund | .................. | 244/158.3 |
| 3,348,352 A * | 10/1967 | Cummings | .................. | 52/646 |
| 3,744,739 A * | 7/1973 | Weaver et al. | ............. | 244/172.4 |
| 3,753,539 A * | 8/1973 | Moore | ................. | 244/5 |
| 4,730,797 A * | 3/1988 | Minovitch | ................ | 244/158.3 |
| 6,491,258 B1 * | 12/2002 | Boyd et al. | ................. | 244/158.1 |
| 6,913,225 B2 * | 7/2005 | Arulf et al. | .................... | 244/10 |
| 7,503,526 B1 * | 3/2009 | Taylor et al. | ............... | 244/158.2 |
| 7,681,840 B1 * | 3/2010 | Taylor et al. | ............... | 244/158.2 |
| 2004/0061024 A1 * | 4/2004 | Arulf et al. | .................... | 244/10 |
| 2006/0163434 A1 * | 7/2006 | Patel et al. | ................ | 244/158.3 |

* cited by examiner

*Primary Examiner* — Philip J Bonzell

(57) ABSTRACT

A sky/space elevator vehicle for going from the surface of a planet or moon up into space and back again. The vehicle has a single fuselage comprising multiple floor sections including a top and bottom cone. The movement of the vehicle is controlled by helium filled envelops as well as a combined jet and rocket propulsion system.

7 Claims, 13 Drawing Sheets

FIG 15 (NEW)

FIG 16 (NEW)

SKY/SPACE ELEVATORS

BACKGROUND OF THE INVENTION

While there are many different ways in which to transport goods and people from the surface of a planet or moon to space and back including spaceships as disclosed by Boyd et al. U.S. Pat. No. 6,491,258 and space elevators, no vehicle has been provided that provides a helium gas bag envelope internal structure to go along with rocket and jet propulsion so that the vehicle an easily travel between the atmosphere and micro gravity while also being able to levitate an free-float in the high atmosphere. The addition of the helium filled gas bags also provides the advantage of reducing thermal friction on re-entry as the vehicle can descend much slower than a conventional vehicle that has only jet or rocket propulsion. An advantage of the combined helium filled gas bags along with the dual jet and rocket propulsion allows for a decrease in the cost of launching mass into space as less fuel is needed as the helium provides a lifting force in the atmosphere.

SUMMARY OF THE INVENTION

The present invention is to create a Sky/Space elevator that can build right now with modern technology.

The Sky/Space elevator of the present invention has mass-levitation as it has a floating function in the atmosphere similar to an airship. This is done by using helium filled gas bag envelopes within the elevator vehicle. The Sky/Space elevator uses navigation and avionics systems along with a combined jet and rocket thrust power to ascend and descend within the atmosphere and in space as well as to reduce thermal friction and the buildup of heat during the re-entry of the Sky/Space elevator into the atmosphere.

The Sky/Space elevator comprises multi-fuel tank storage compartments, top and bottom escape cockpits with ejection rockets and parachute compartments to assist with landing in the event of an emergency.

Another objective of the inventions of Sky/Space elevator structure is that it comprises a longitudinal cylindrical center elevator that is direct connected and integrated into each multi-level floor structure of first section level through fifth section level fuselage. Thus providing the ability to easily to move between first, second, third, fourth and fifth section level floors for reliable vehicles transportation.

The first section level stage of the Sky/Space elevator comprises landing pads, a winching machine room that provides an operating rolling rope with latch/locking hook systems at the lowest floor so as to be able to anchor at an Earth station when landing using an autonomous computer system so as to lock the hook at Earth's ground terminal. The hook system can also be used to anchor the Sky/Space elevator to a device in the atmosphere when floating using the helium gas bag envelopes or in space when it is out of the atmosphere. This allows for a secure connection so that crew, passengers, and cargo can be safely loaded and unloaded from the Sky/Space elevator to another vehicle. The first section level stage also comprises a small circular pressurized air-lock docking door which is two and half feet in diameter and has a triple air lock tube which provides leak proof air pressurized cabin for the crew to use as a working space.

The second section level stage of the Sky/Space elevator comprises multi-floor levels and a cone shape which define a bottom escape cockpit with an ejection rocket and parachutes that operate to help in emergency situations.

The third section level stage of the Sky/Space elevator contains the jet and rocket power plants in the second floor. The rocket propulsion power plant co-exists with the jet power plant and is separated by an insulated wall and door. The first and third floors of the third section level stage comprise multiple jet flaps and rocket nozzles to allow for discharge of exhaust gas. The jet power plant is provided with a two way duct tube to connect an upper and bottom flap by using a dual manifold valve control operating autonomous computer system. The rocket power plant is supplied with liquid fuel and an oxidizer with high pressure pumps through pipe and gauge systems. The second floor of the third section level stage provides a hanger operably to handle space crafts, satellites, and other planetary rockets as well as four launch/docking bays.

The fourth section level stage of the Sky/Space elevator contains the helium filled gas bag envelopes that are mounted on the first floor and at an upper ceiling using anchor plates. The first floor provides space to inspect and repair the gas bag envelopes through multiple floor gates. As with the rest of the Sky/Space elevator there is a central core that provides room for a central elevator.

The fifth section level stage of the Sky/Space elevator comprises multiple floors including a top escape cockpit with ejection rockets just like the first section level stage.

DETAILED DESCRIPTION OF THE EMBODIMENTS OF INVENTION

FIG. 1-5, Show the Sky/Space elevator 100, according to embodiment of the present invention.

FIG. 6-16, Show the Sky/Space elevator 100, inner structure of the present invention.

The Sky/Space elevator structure for the sky/space elevator 100 comprises a single body fuselage structure with multiple section level stages each of which have a connected center elevator 3. Further, first section level stage 30 to 28 (A), second section stage level 10 to 37 (B), third section stage level 60 to 62 (C), fourth section stage level is the bottom of 39 to top of 54 (D), and fifth section stage level of 6 to 12 (E).

As show in FIGS. 3, 4, 5, 6, 7, 8, 9, 10, 11, 13 and 15, the Sky/Space elevator 100 comprises a center core structure with a center elevator 3 that is defined from the top escape cockpit 12 to bottom cockpit 10 and provides rapid transportation along the multiple floors of each section level stage A-E.

The first section level stage 37 and A comprises multiple floor levels from level 30 to 28, is comprises bottom escape cockpit 10 having a cockpit window 48, with ejection rockets 11 and an elastic cushion 49 that are autonomously operated and activate thrust power to eject and separate from main sky/space elevator by retro-ejector rockets and safely escape by parachutes to save lives in an emergency. Also, the first section level stage comprises control office, passenger area 74, beds, lavatory, food service, fuel storage compartment and living quarter. As show in FIGS. 7, 8, and 12 first section A comprises landing elevator doors 23, landing pads 30, compartments at lower floor level provides winching machine with ropes with locking hooks which are adapted to anchor to ground terminal anchor station for landing and docking when it is time to load and unload cargo, as well as at Earth terminal station. Multiple docking pods 28 are designed to allow for docking to other space vehicles as well as for space walking by crew-members.

The second section level stage 38 and B comprises large cone shaped with multiple floor levels, and comprises a first floor level 10, provided with an escape cockpit with ejection rockets propulsion 11, jet and rocket fuel tank storages, helium and water tanks, pumping stations, plumbing and electrical systems, hydraulic and pneumatic systems 37, and a variety of gauge systems and center elevators 3.

Figure 1:
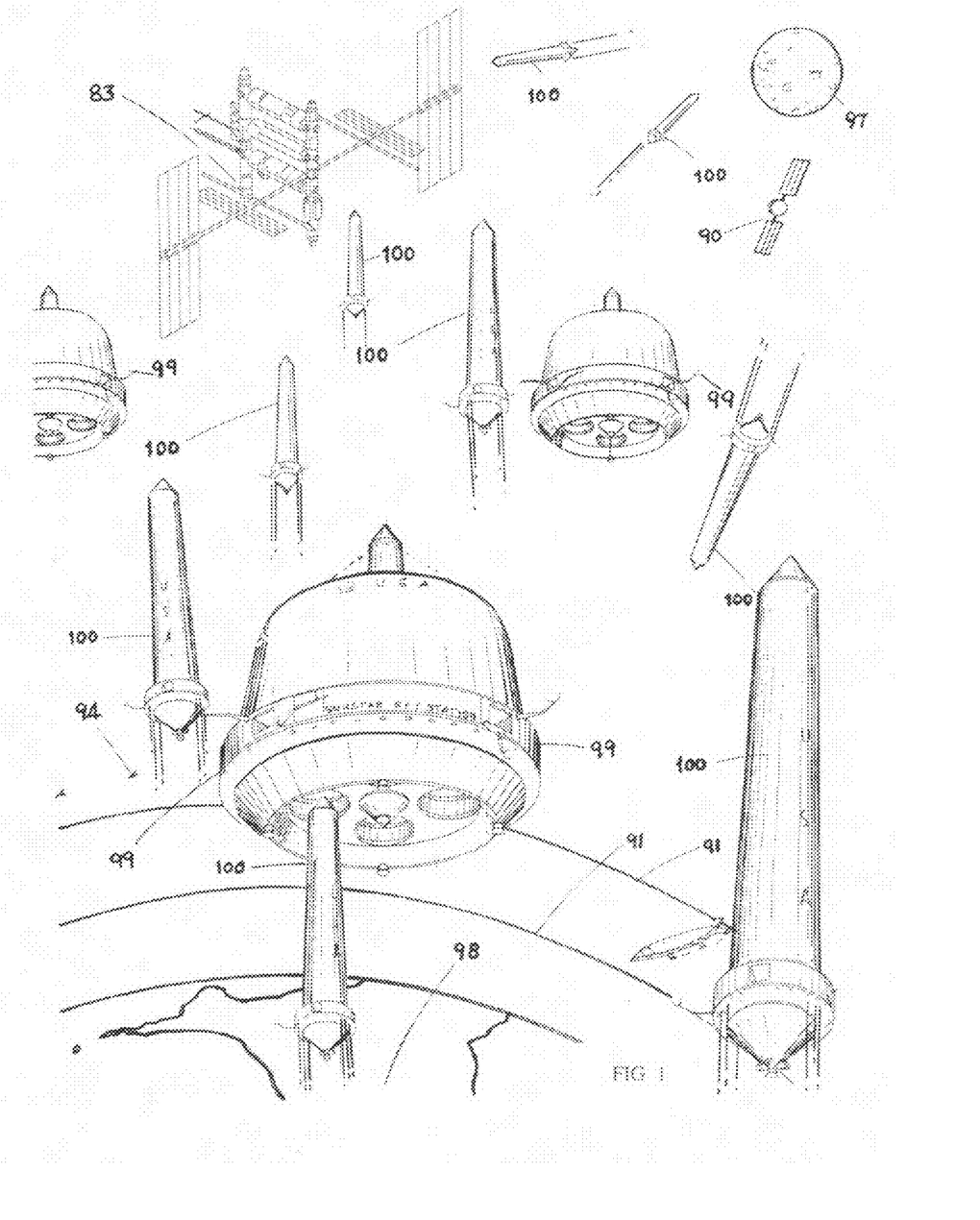
FIG. 1. Is a Illustrated prospect view of Sky/Space elevators and Sky stations at sky.
Figure 2:
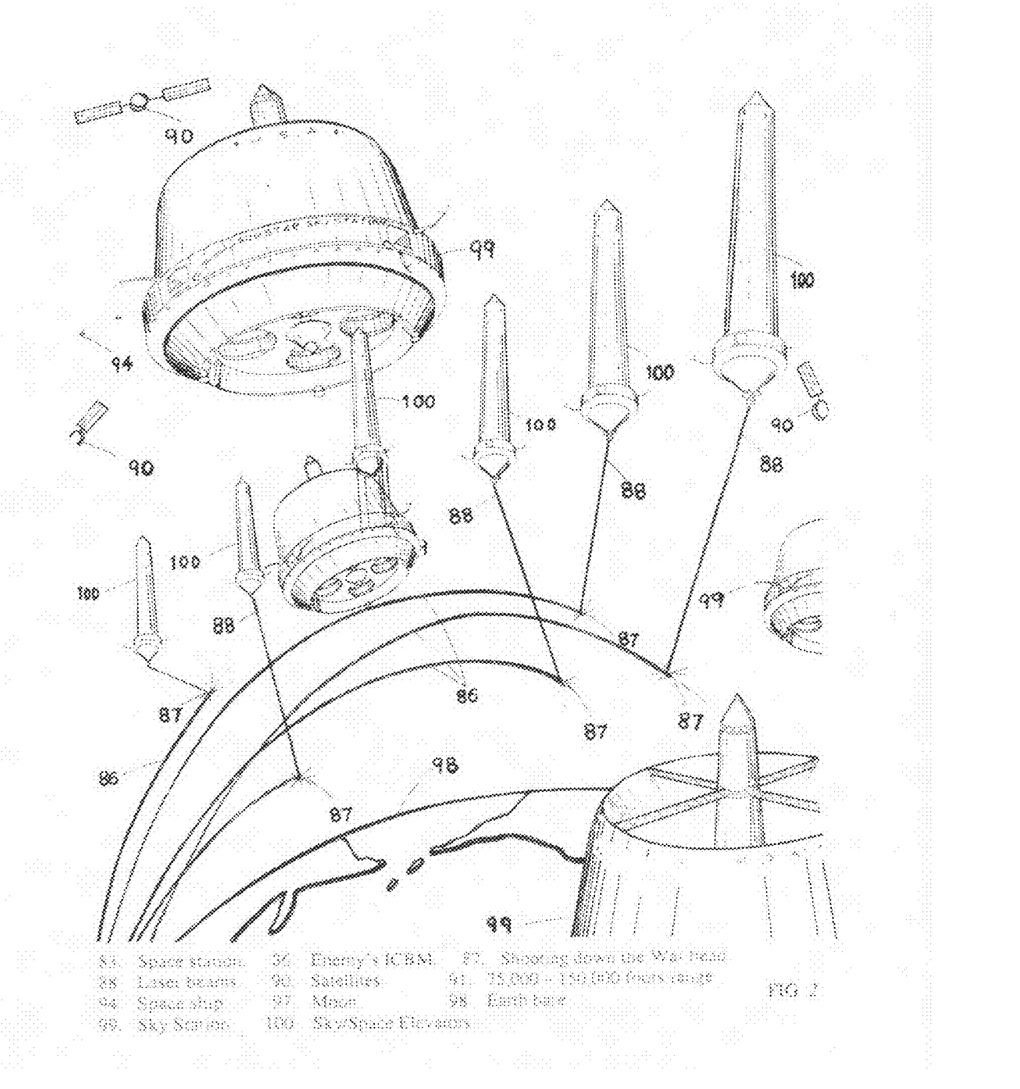
FIG. 2. Is a Illustrated another prospect view of Sky/Space elevators and Sky stations at sky.
Figure 3:
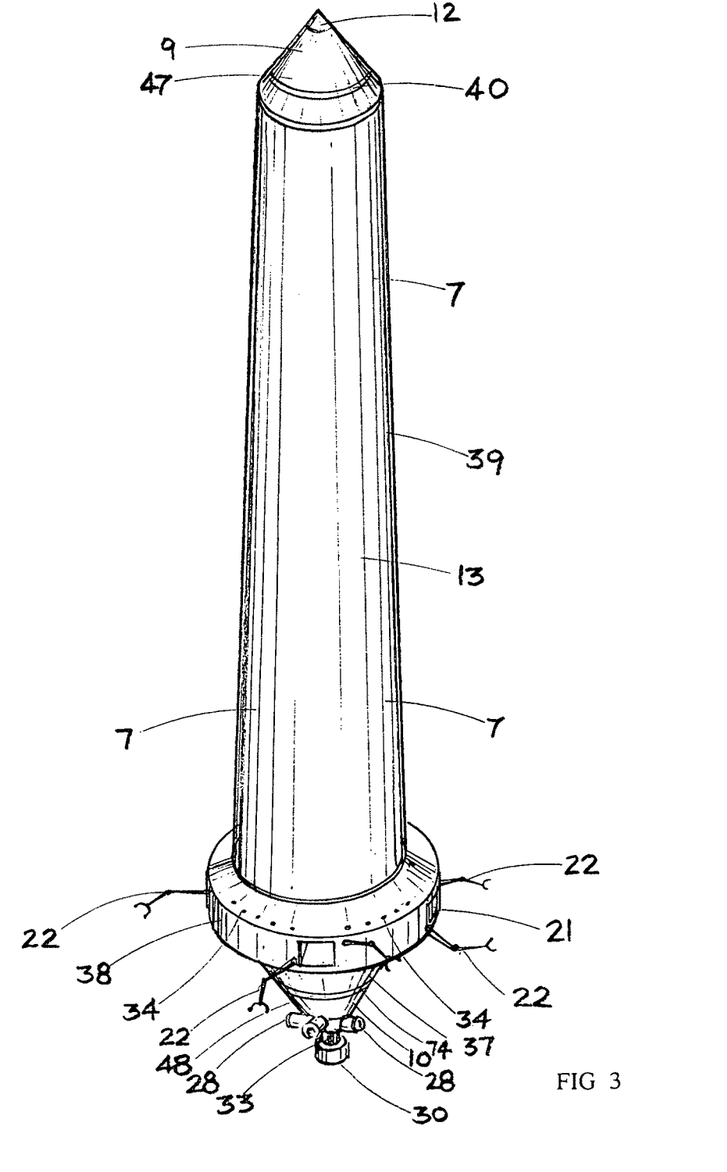
FIG. 3. Is a prospect top view showing the Sky/Space elevators having a structure according to an embodiments of the present invention.
Figure 4:
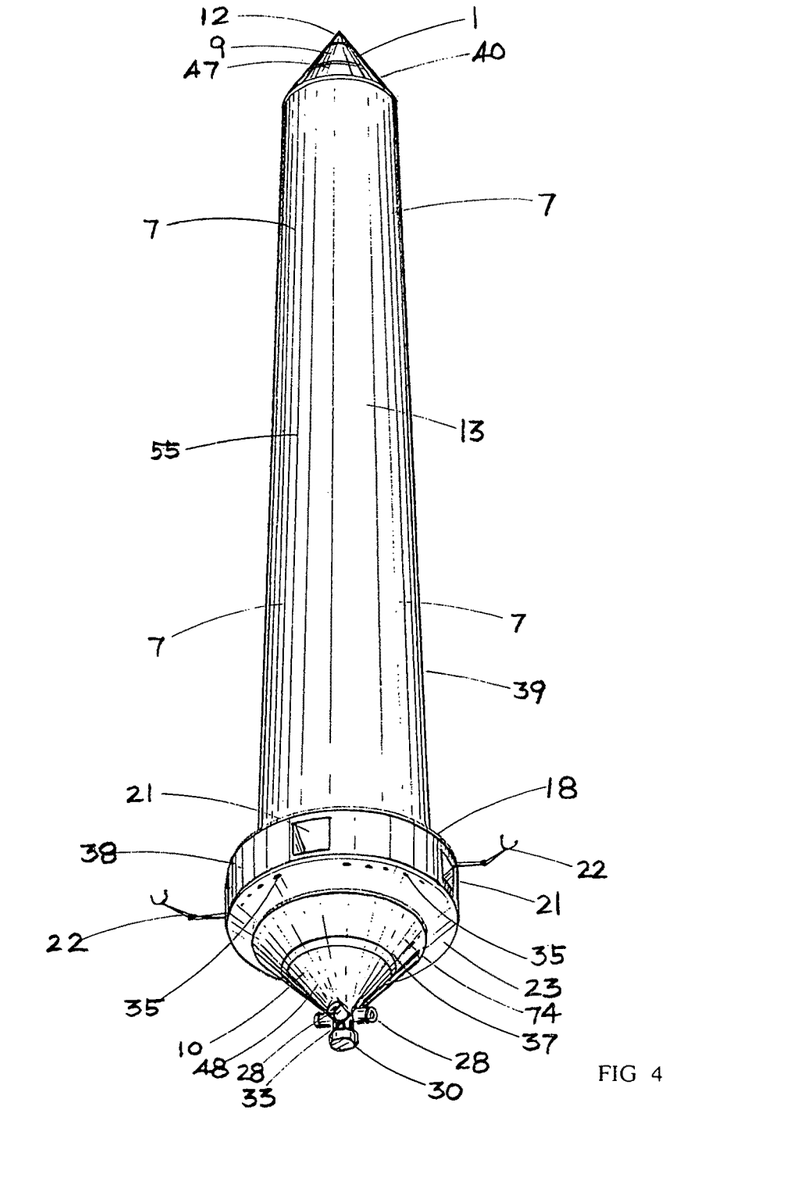
FIG. 4. Is a prospect bottom view of Sky/Space elevator FIG. 3.
Figure 5:
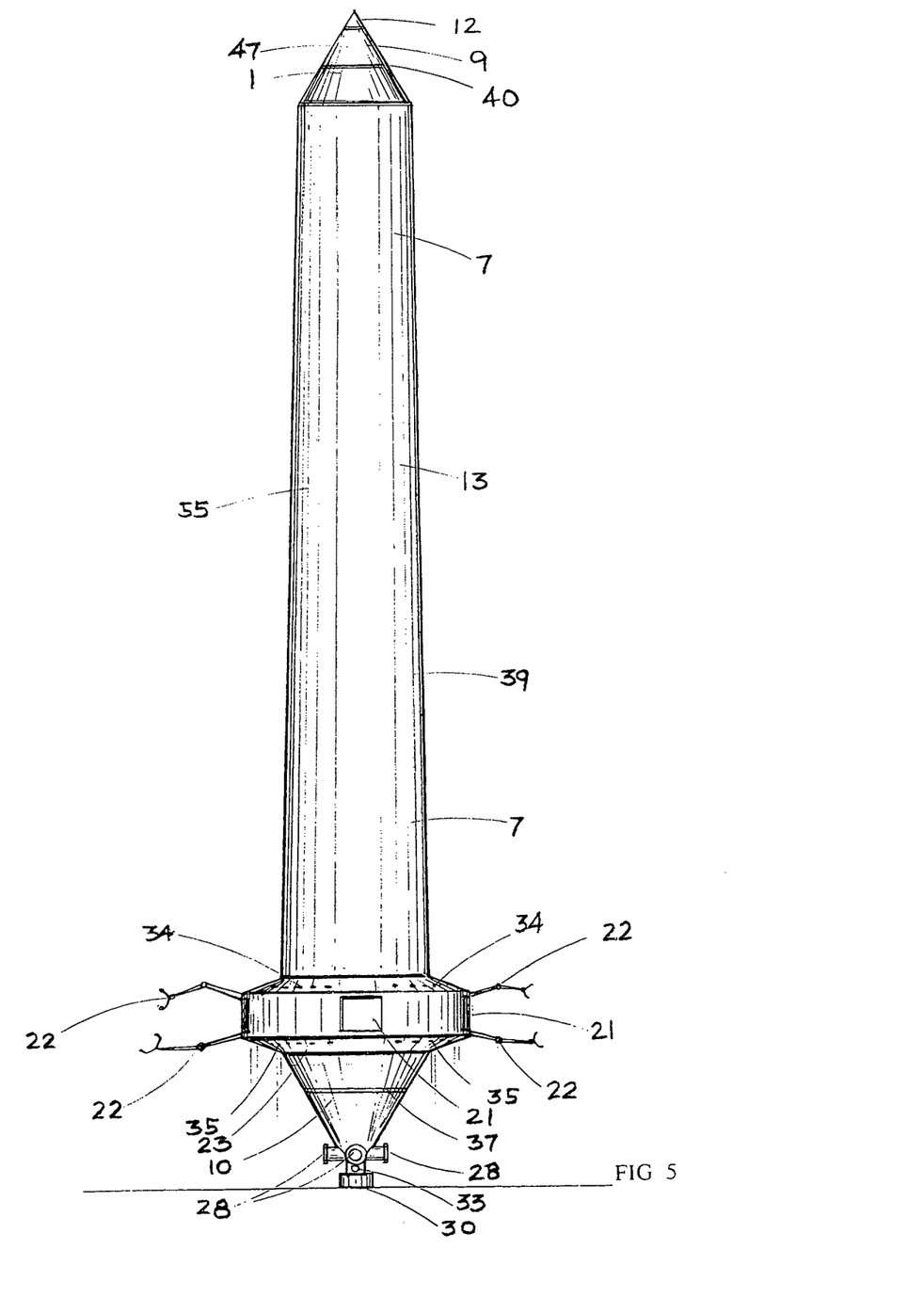
FIG. 5. Is a front view, side view, rear view of Sky/Space elevator FIG. 3.
Figure 6:
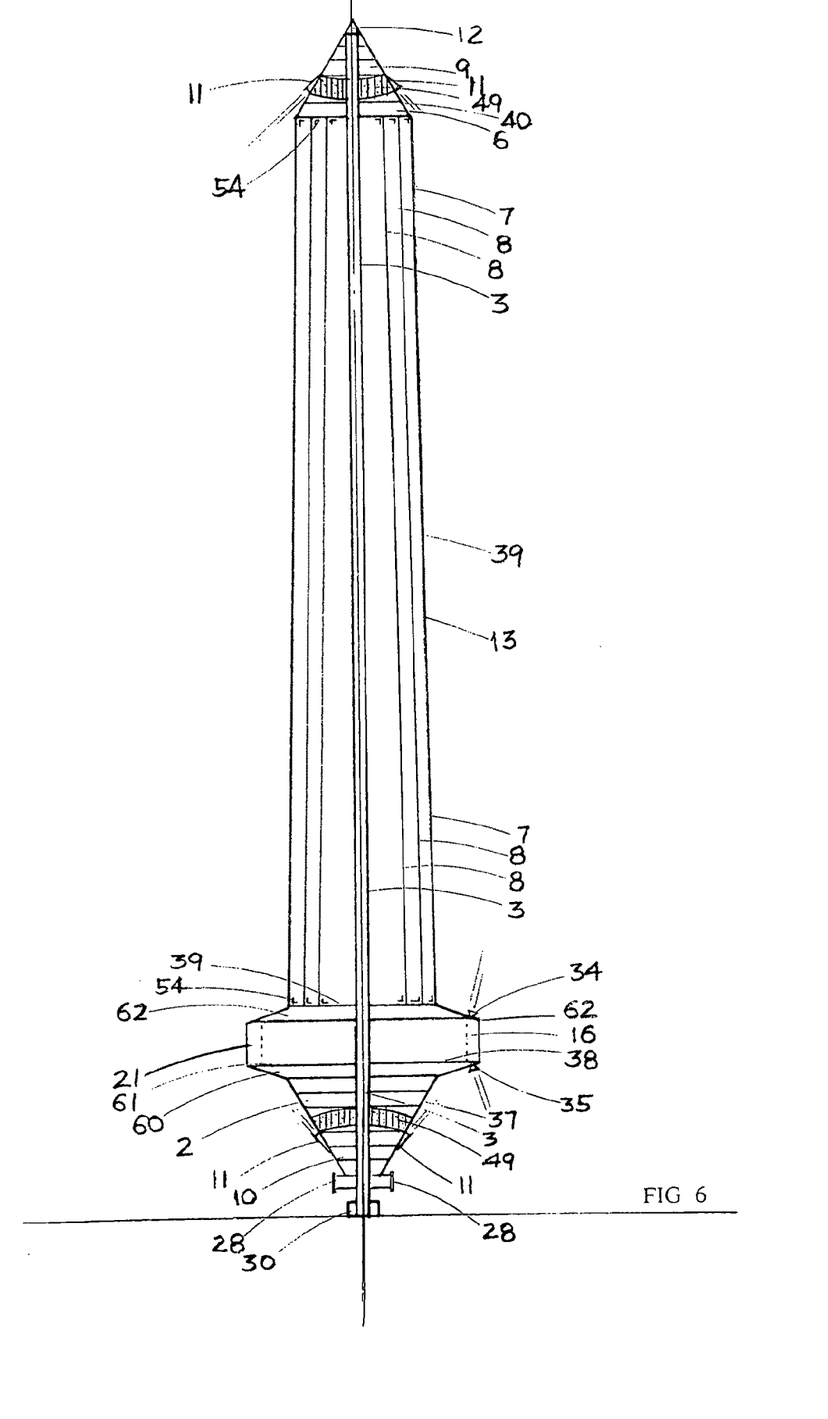
FIG. 6. Is a cross sections A-A' view of Sky/Space elevator FIG. 3.
Figure 7:
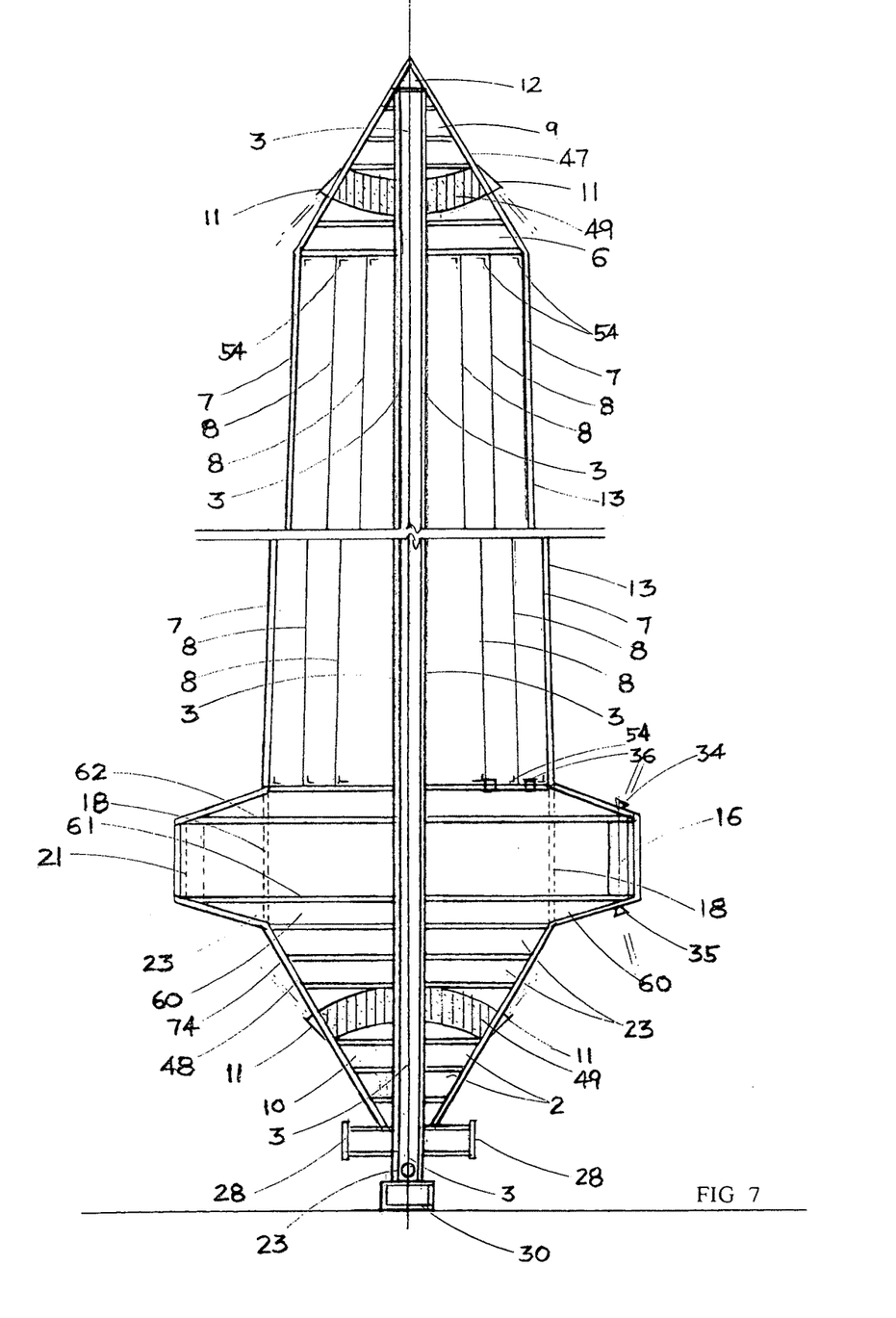
FIG. 7. Is a large scale cross sections detail view of Sky/Space elevator FIG. 3.
Figure 8:
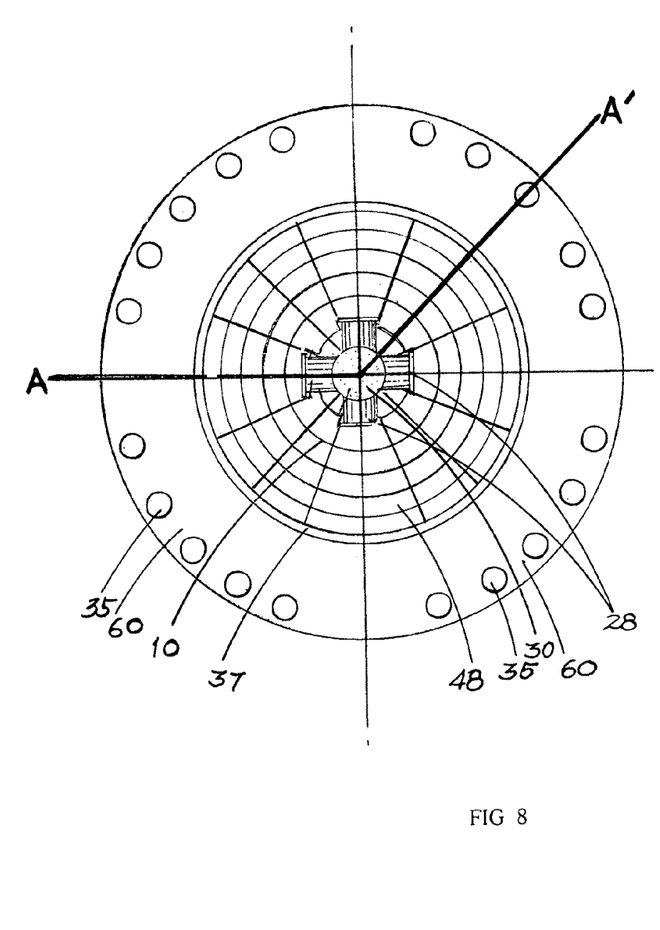
FIG. 8. Is a bottom plan view of Sky/Space elevator FIG. 3.
Figure 9:
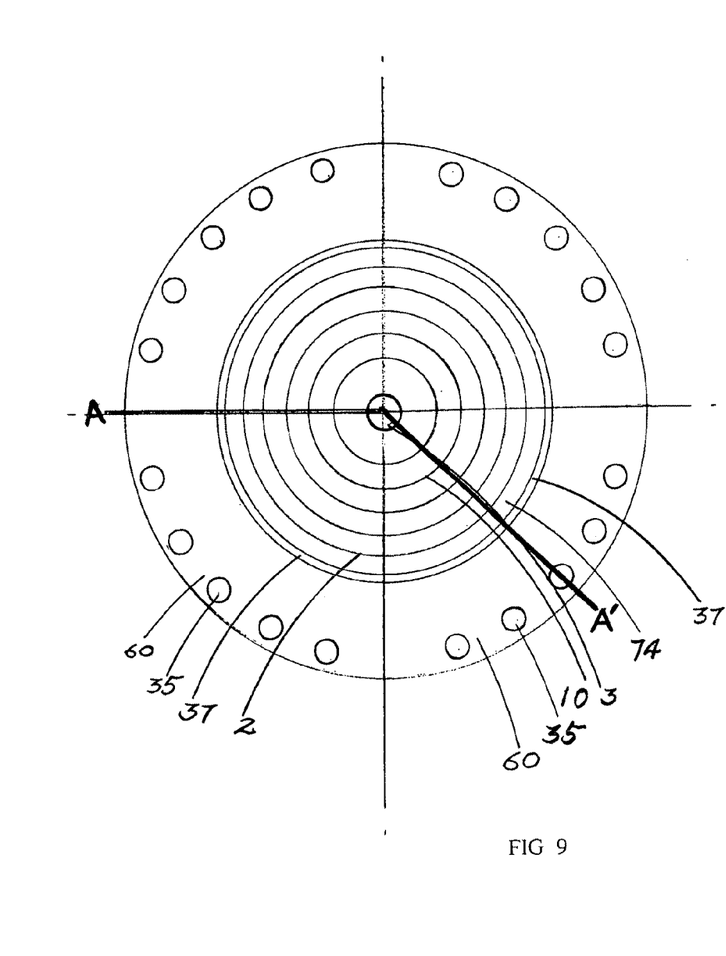
FIG. 9. Is a first section plan view of Sky/Space elevator FIG. 3.
Figure 10:
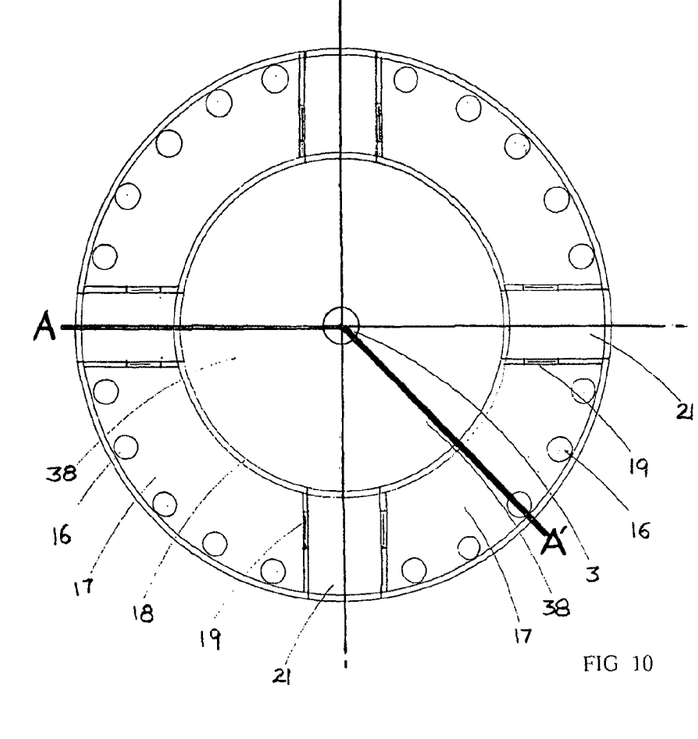
FIG. 10. Is a second section plan view of Sky/Space elevator FIG. 3.
Figure 11:
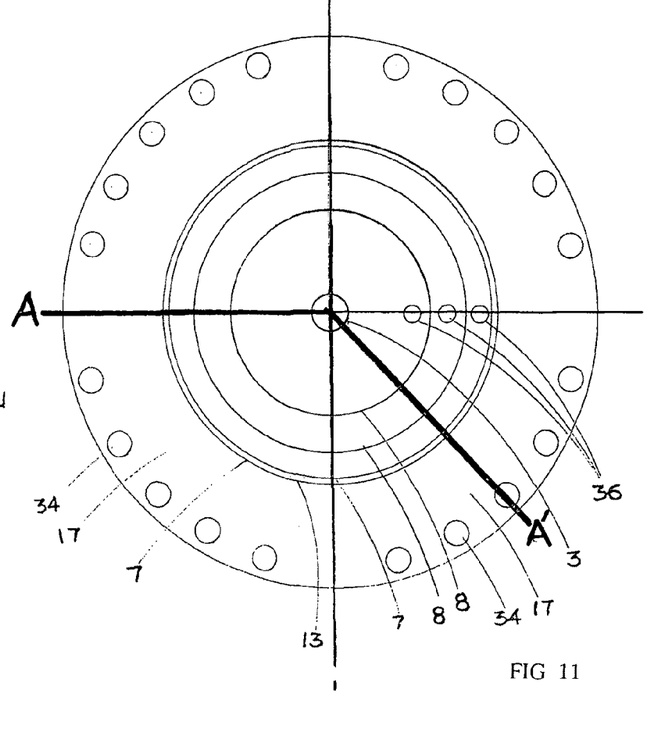
FIG. 11. Is a third section plan view of Sky/Space elevator FIG. 3.
Figure 12:
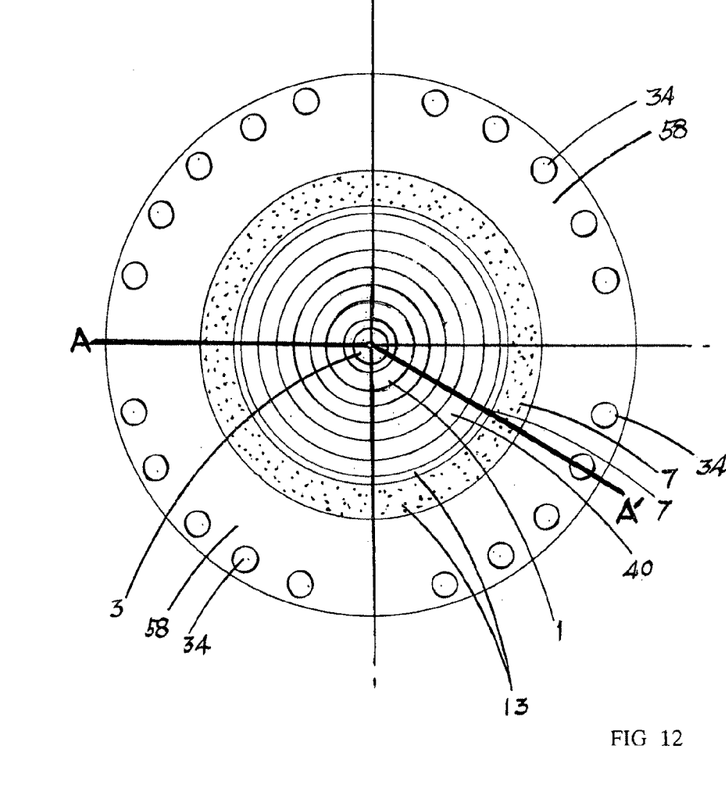
FIG. 12. Is a fourth section plan view of Sky/Space elevator FIG. 3.
Figure 13:
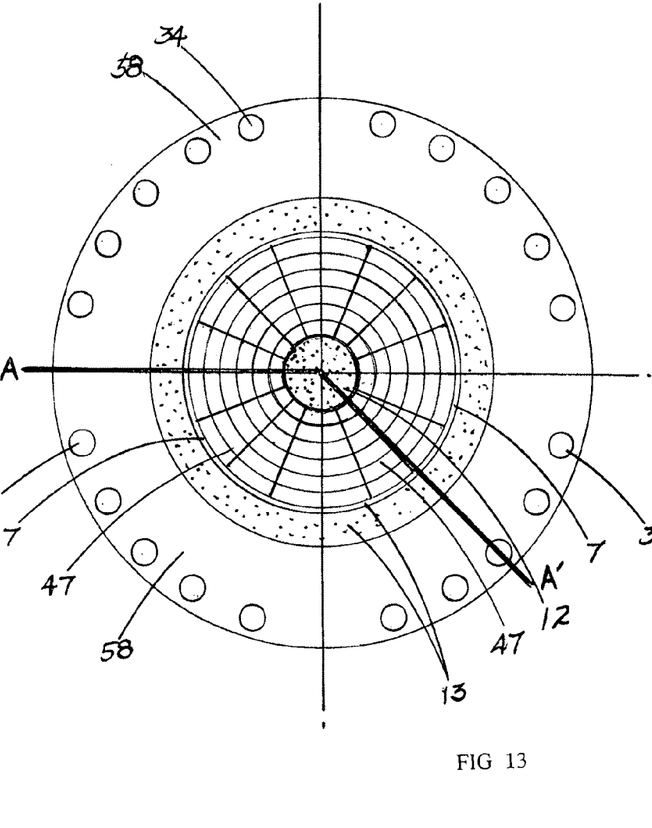
FIG. 13. Is a fifth section plan view of Sky/Space elevator FIG. 3.
Figure 14:
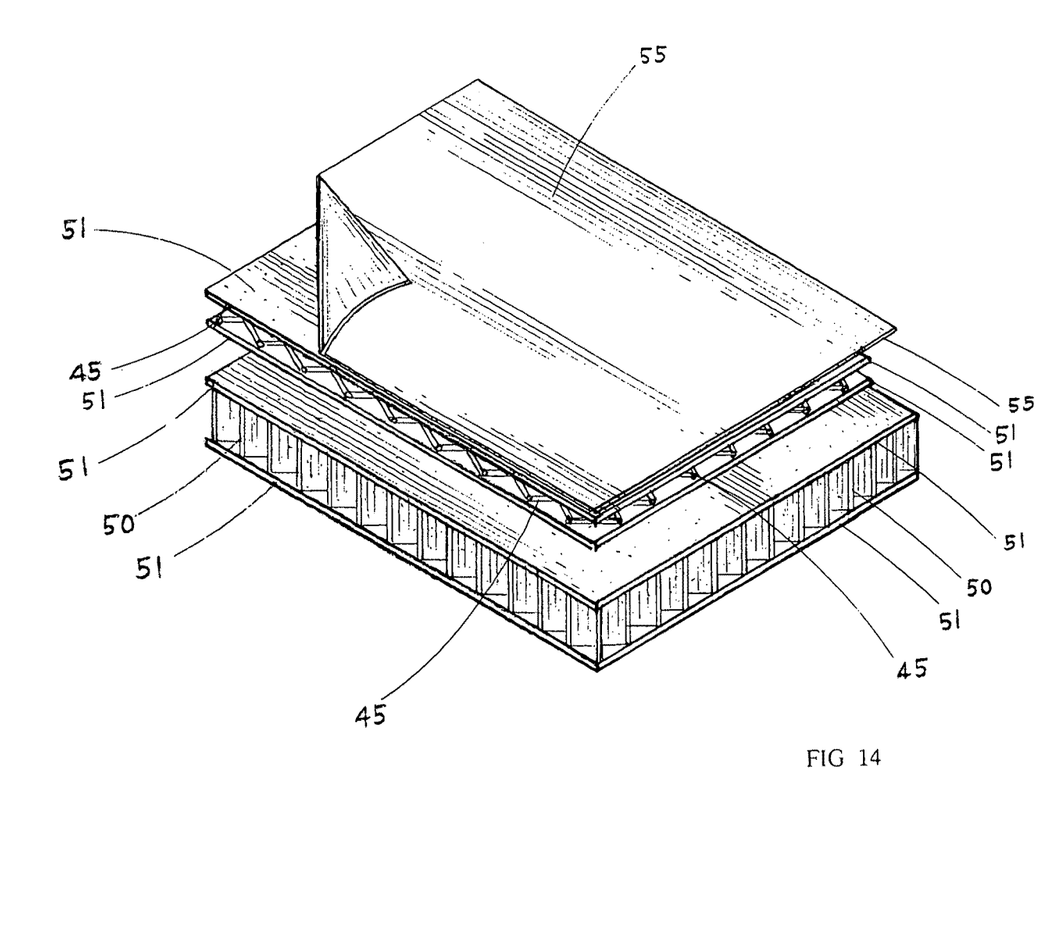
FIG. 14. Is a cross section of ceramic fiber outer wall and floor structure view.
Figure 15:
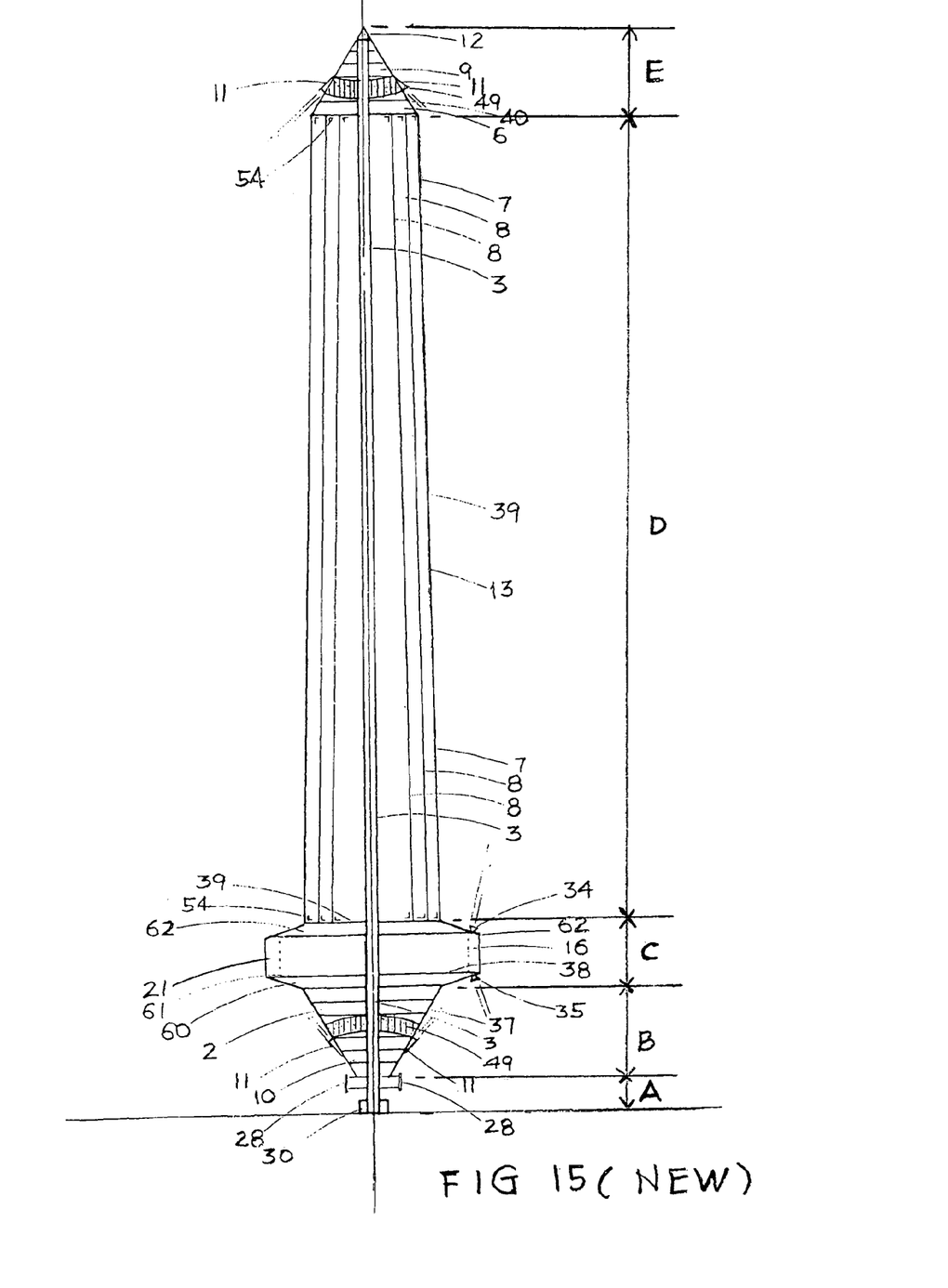
FIG. 15. Is provides marking each section of first (A), second (B), third (C), fourth (D) and fifth (E) section level of each section of fifth section stage level structure of FIG. 6, view of Sky/Space elevator. (New)

The third section level stage 39 and C comprises a first floor level 60, a second floor level 61, and a third floor level 62 with the center elevator running through the middle of all three floors including sliding doors operated by an autonomous computer system. The combined jet and rocket power plant 16 is located at the edge of the cylindrical second floor level 61. The nozzles 34 and 35 for the jet and rocket power plant is located on the edge of the first and third floor levels which allow for ascent, descent and other movements of the elevator. The second floor level 61 also includes a central hanger with a variety of robotic arm crane systems 22 controlled by electro-computer systems arranged for handling space crafts, other rockets, and satellites at large launch/docking bays 21 at the edge of the outer ring structure. The robotic arms 22 also operate to handle the docking and departing at launch/docking bays 21 into and out of the central hangar. The jet and rocket power plants 16 are separated with insulating walls 18 and doors 19 as seen in FIG. 10. The third section level stage having a diameter larger than any of the diameters of the rest of the sky/space elevator.

The fourth section level stage 40 and D is defined between the first floor level 39 and the bottom of the fourth section level stage at the anchor plates 54. There are lockable floor gates 36 that are three inches thick and two and a half feet in diameter that provided in the first floor level 39 that allow access to inside the fourth section level stage D where the gas filled helium bag envelopes 7 and 8 are located. As with the rest of the elevator, a center elevator 3 is located within the center of the fourth section level stage. The gas filled helium bag envelopes 7 and 8 are a ceramic fiver fabric that is impregnated with multi-grid carbon wire 45 between two ceramic composites which is a light weight and is very strong in shear. The gas filled helium bag envelopes are connected at anchor plates at the top and bottom of the fourth section level stage.

The fifth section stage level E comprises a top escape cockpit 9 with a cockpit window 47 and a parachute compartment 12 and ejection rockets 11 along with an elastic cushion 49. An upper control tower 6 comprises avionics, navigation systems, weather stations, airborne laser shielding system, ABM systems, SDI program systems, a security system As shown FIGS. 1, 6, 7 and 15; the Sky/Space elevator vehicle 100, travels from and Earth station 98, in vertically flight to high density atmosphere 91. This first stage is performed by jet thrust power to approximate seventy five thousand feet wherein a second stage starts which has rocket thrust power taking over for the jet thrust power, to micro gravity orbit space. For this point, the elevator vehicle 100 can proceed to a lunar orbit or to another planet such as Mar's light atmosphere and then can return to Earth 98 in the opposite way it launched. At any time during the Sky/Space elevator's mission it can stop at satellites 90, space station 83 such as ISS and sky-station 99, which floats in the atmosphere.

As shown FIGS. 2, 6, 7 and 15; the sky/space elevator vehicle can be part of a fleet that can be used as defense to shoot down enemy ICBMs 87, by lasers 88. The Sky/Space elevator 100 is capable of hosting a variety of weapons on board As shown FIGS. 6, 7, 14 and 15; the wall of the sky/space elevator 100 has an outer photo solar cell 55, carbon fiber fabric 51, multi-grid carbon net-wire 45, geometric structure of inner core structure 50, which is constructed with glued technology.

Figure 16:
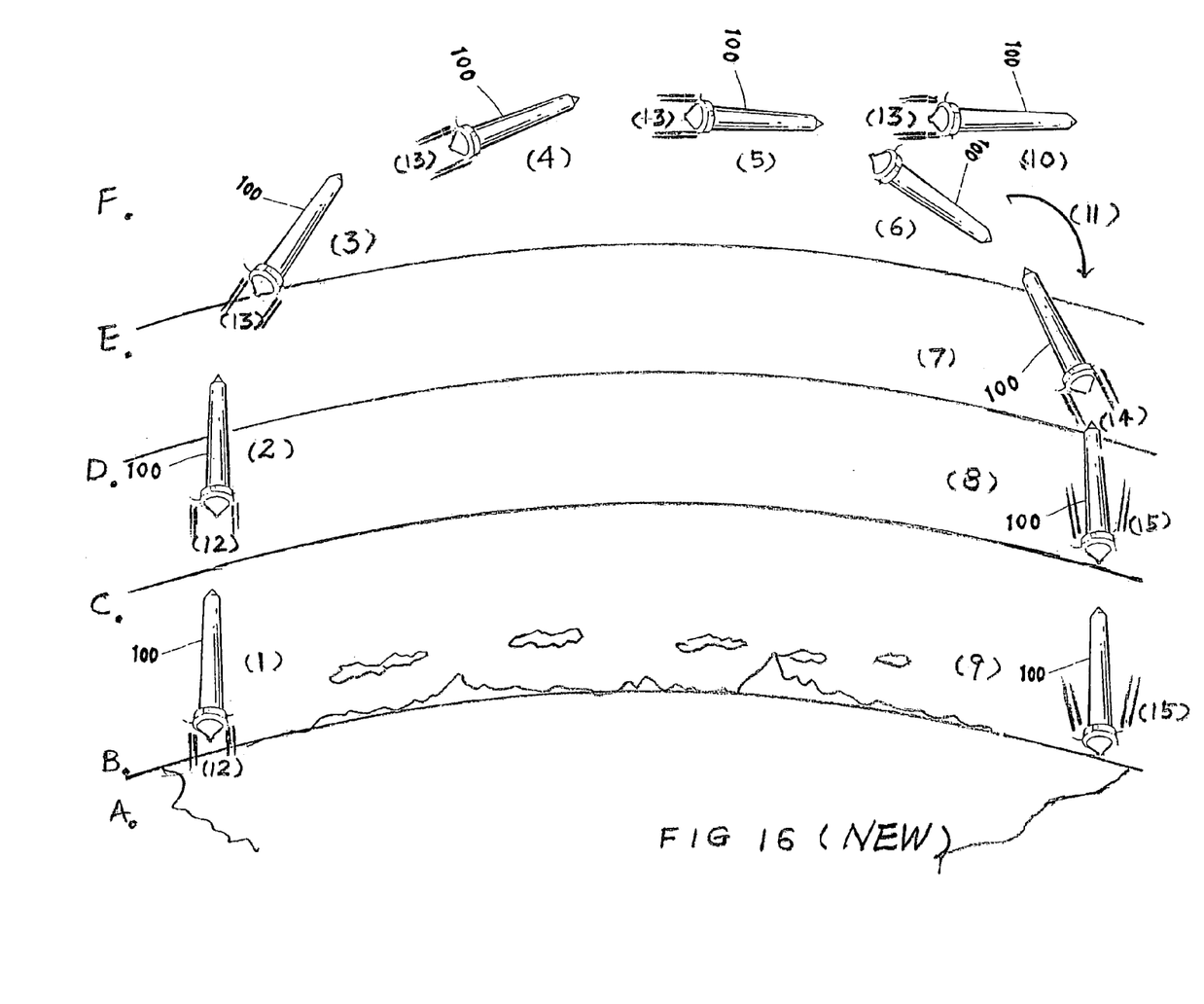
FIG. 16. Is a provides sequence of ascend, descend, lifting and landing Sky/Space elevator craft at two different environment of the atmosphere through the space.

As shown FIG. 16; the sky/space elevator can operate on the surface of the Earth A, at the near Earth surface B-C; in a high density atmospheric zone C-D; in a low density atmospheric zone D-E, in a very low density and high altitude atmospheric zone E-F and a micro gravity space zone F. The first stage (1) is when the Sky/Space elevator vehicle is anchored to an Earth station and then floats up and can also use jet propulsion to get to the second stage (2) to around seventy five thousand feet. The second stage (2) shows that the Sky/Space elevator continues its ascend vertically using its rocket propulsion 12 to very low-density atmosphere approximate around one hundred fifty thousand 150,000. The third stage (3) shows the Sky/Space elevator continuing to ascend vertically slant curve rout by rocket propulsion power 13, to space. The fourth stage (4) continues vertical ascend and the slant-curve route by the rocket propulsion power 13 until it enters an orbit route in space. The fifth stage (5) continues the Sky/Space elevator in orbit. At this point the Sky/Space elevator has the choice to continue the orbital route or it can return to earth station by power 13. The sixth stage (6) is where the Sky/Space elevator returns to Earth using Earth's gravity. The seventh stage (7) shows the Sky/Space elevator vehicle 100 before reach the re-entry atmosphere. The elevator 100 performs a 180 degree flips-turn 11, and the helium gas bag envelope system helps to slow decent along with using the rocket propulsion 14. The eighth and ninth stage (8), (9; continue descend of the Sky/Space Airship elevator by jet-propulsion power thrust 15 at high-density atmosphere until the Sky/Space elevator lands.

What is claimed is:

1. A sky/space elevator vehicle comprising:
a single fuselage structure comprising:

multiple section stage levels including a top cone and a bottom cone each of which having an escape cockpit with ejection rockets and parachutes that provide a safe way to escape the vehicle in the event of an emergency;

a plurality of gas filled helium bag envelopes located in one of the section stage levels so as to allow the vehicle to float in the atmosphere;

wherein the gas filled helium bag envelopes are connected to the fuselage with anchor plates;

the gas filled helium bag envelopes being accessed and repaired by hinged and lockable floor gates;

wherein a central elevator is located in a central portion of the fuselage structure, the vehicle having a combined jet and rocket propulsion thrust system;

wherein the jet and rocket power plant system has nozzles on an upper and lower portion of one of the section stage levels, wherein in conjunction with the gas filled helium bag envelopes the jet and rocket power plant system are used for the vertical ascent and descent of the vehicle including a slow descent to reduce thermal friction upon re-entering the atmosphere; and a center hangar having four docking bays located on an outside of the single fuselage structure.

2. The sky/space elevator vehicle of claim 1, wherein the floor gates provide a supply of helium to the gas filled helium bag envelopes; and the floor gates being three inches thick and two and a half feet in diameter.

3. The sky/space elevator vehicle of claim 1, wherein the wall of the Sky/Space elevator has an outer photo solar cell, a carbon fiber fabric, a multi-grid carbon net-wire, a geometric structure of inner core structure, which is constructed with a glued technology.

4. The sky/space elevator vehicle of claim 1, wherein each escape cockpit has a window and an elastic cushion.

5. The sky/space elevator vehicle of claim 1, wherein the central elevator is directly connected an integrated to each section stage level.

6. The sky/space elevator vehicle of claim 1, wherein the multiple section stage levels comprise:
a first section stage level including crew docking bays;
a second section stage level including the bottom cone;
a third section stage level including the center hangar and the jet and rocket propulsion thrust system;
a fourth section stage level including the plurality of gas filled helium bag envelopes; and
a fifth section stage level including the top cone.

7. The sky/space elevator vehicle of claim 6, wherein the third section stage level has a diameter larger than a diameter of any of the first, second, fourth, or fifth section stage level.

* * * * *